United States Patent
Wang et al.

(10) Patent No.: US 10,287,166 B2
(45) Date of Patent: May 14, 2019

(54) CARBON NANOTUBE FILM AND METHOD FOR MAKING THE SAME

(75) Inventors: Yu-Quan Wang, Beijing (CN); Chen Feng, Beijing (CN); Liang Liu, Beijing (CN); Li Qian, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 1310 days.

(21) Appl. No.: 13/437,110

(22) Filed: Apr. 2, 2012

(65) Prior Publication Data
US 2013/0115439 A1    May 9, 2013

(30) Foreign Application Priority Data
Nov. 8, 2011 (CN) .......................... 201110349846.2

(51) Int. Cl.
*B32B 9/00* (2006.01)
*C01B 32/168* (2017.01)
*B82Y 30/00* (2011.01)

(52) U.S. Cl.
CPC .............. *C01B 32/168* (2017.08); *B82Y 30/00* (2013.01); *Y10T 428/249924* (2015.04)

(58) Field of Classification Search
CPC .......... C01B 31/022–31/0293; C01B 2202/00; Y10T 428/30; Y10S 977/742; B82Y 30/00
USPC ............................ 428/408; 423/448; 977/742
See application file for complete search history.

(56) References Cited

U.S. PATENT DOCUMENTS

| | | | |
|---|---|---|---|
| 6,407,922 B1 * | 6/2002 | Eckblad | B82Y 10/00 165/185 |
| 2006/0071334 A1 * | 4/2006 | Kawabata | B82Y 10/00 257/741 |
| 2007/0166223 A1 | 7/2007 | Jiang et al. | |
| 2008/0170982 A1 | 7/2008 | Zhang et al. | |
| 2008/0248235 A1 * | 10/2008 | Feng | B32B 38/10 428/113 |
| 2010/0144004 A1 | 6/2010 | Zhong et al. | |

FOREIGN PATENT DOCUMENTS

| | | |
|---|---|---|
| CN | 1982209 A | 6/2007 |
| CN | 101643702 A | 2/2010 |
| TW | 201024208 A1 | 7/2010 |
| TW | 201109275 | 3/2011 |

* cited by examiner

*Primary Examiner* — Daniel H Miller
(74) *Attorney, Agent, or Firm* — ScienBiziP, P.C.

(57) ABSTRACT

A carbon nanotube film includes a first end and a second end. The second end is opposite to the first end. The carbon nanotube film includes a number of carbon nanotube wires and at least one first carbon nanotube film connected adjacent carbon nanotube wires of the number of carbon nanotube wires. The carbon nanotube wires fan out from the first end to the second end such that a distance between the adjacent carbon nanotube wires gradually increases from the first end to the second end. The carbon nanotube film defines an open angle. A method for making the above-mentioned carbon nanotube film is also provided.

13 Claims, 3 Drawing Sheets

CARBON NANOTUBE FILM AND METHOD FOR MAKING THE SAME

RELATED APPLICATIONS

This application claims all benefits accruing under 35 U.S.C. § 119 from China Patent Application No. 201110349846.2, filed on Nov. 8, 2011 in the China Intellectual Property Office, the disclosure of which is incorporated herein by reference.

BACKGROUND

1. Technical Field

The present disclosure relates to a carbon nanotube film and a method for making the carbon nanotube film.

2. Discussion of Related Art

Carbon nanotubes are excellent in electrical conductivity, thermal conductivity, field emission, and electromagnetic shielding. Therefore, preparations of carbon nanotube films have attracted attention. Traditional methods for making carbon nanotube films generally include a directly growing method, a spraying method, or a Langmuir Blodgett method. However, carbon nanotubes in carbon nanotube films made by the above methods are randomly arranged.

A method for making a carbon nanotube film by a drawing method includes providing a carbon nanotube array and drawing the carbon nanotube film from the carbon nanotube array along a certain direction. The carbon nanotubes in the carbon nanotube film are orderly arranged, and most of the carbon nanotubes are oriented along a single direction. Further, carbon nanotubes substantially being perpendicular to the single direction are substantially parallel to each other. However, this film structure is directional and can be applied in limited configurations.

What is needed, therefore, is to provide a carbon nanotube film with a unique structure and a method for making the same, to overcome the above shortages.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
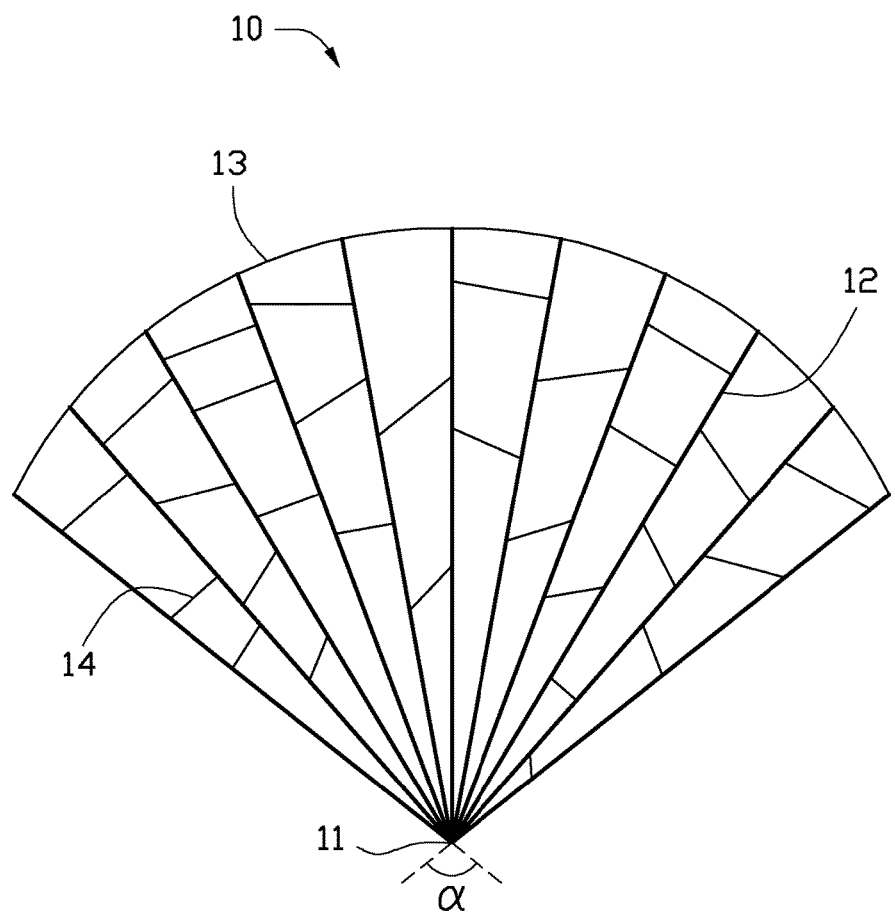
FIG. 1 is a schematic view of one embodiment of a carbon nanotube film, wherein the carbon nanotube film includes a number of carbon nanotube wires.

Referring to FIG. 1, one embodiment of a carbon nanotube film 10 is provided. The carbon nanotube film 10 includes a first end 11 and a second end 13. The second end 13 is opposite to the first end 11. The carbon nanotube film 10 includes a number of carbon nanotube wires 12 and at least one first carbon nanotube 14. The at least one first carbon nanotube 14 is located between and connects adjacent carbon nanotube wires 12.

The carbon nanotube wires 12 fan out from the first end 11 to the second end 13, such that a distance between adjacent two carbon nanotube wires 12 gradually increases from the first end 11 to the second end 13, thus forming an angle defined by the adjacent two carbon nanotube wires 12. Thereby a number of angles are defined by the number of carbon nanotube wires minus one. If the carbon nanotube wires 12 are uniformly dispersed in the carbon nanotube film 10, the angles defined between every two adjacent carbon nanotube wires 12 are substantially equal. Otherwise, if the carbon nanotube wires 12 are randomly arranged, the angles defined between two adjacent carbon nanotube wires 12 are different from each other.

A shape of the first end 11 can be any shape such as a point, a straight line, or a curve shape. A shape of the second end 13 can also be any shape such as a straight line or a curve shape. The curve shape can be an arc shape, or a polygonal line. The carbon nanotube film 10 includes two outermost sides. Each of the two outermost sides connects with the first end 11 and the second end 13. The two outermost sides define an open angle $\alpha$. The open angle $\alpha$ is larger than 0 degrees, and less than 180 degrees. In one embodiment, the open angle $\alpha$ is larger than 30 degrees, and less than or equal to 120 degrees. In another embodiment, the open angle $\alpha$ is larger than 30 degrees, and less than or equal to 90 degrees. If the first end 11 is a straight line or a curve, the open angle $\alpha$ is defined by extending lines of the two outermost sides. In one embodiment, the carbon nanotube film 10 is pie-shaped, the first end 11 is a point, and the second end 13 is arc-shaped, the open angle $\alpha$ is about 60 degrees.

Figure 2:
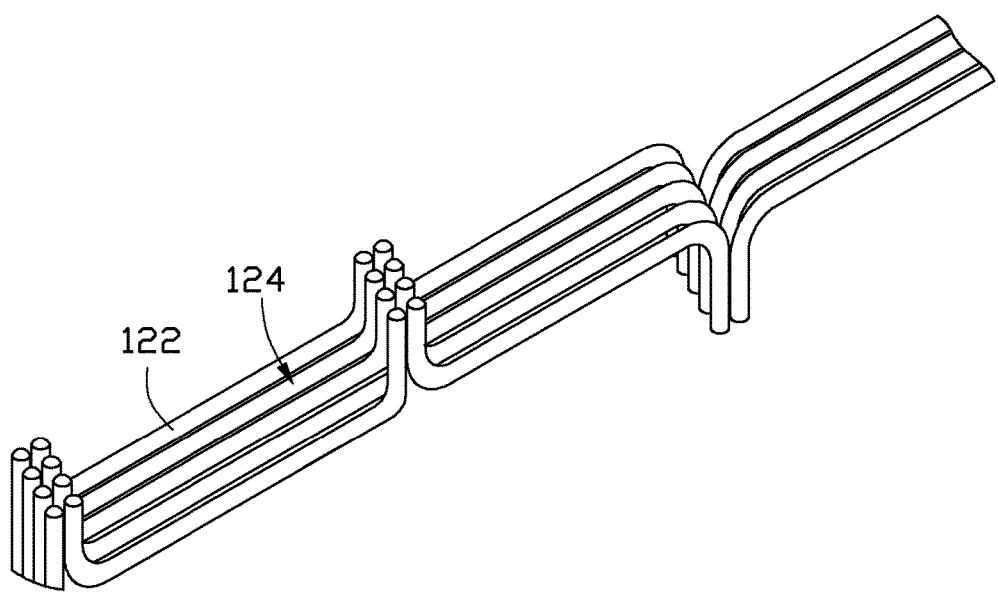
FIG. 2 is a schematic view of one of the carbon nanotube wires shown in FIG. 1.

Referring to FIG. 2, each carbon nanotube wire 12 includes a number of successive and oriented carbon nanotube segments 124. Each carbon nanotube segment 124 includes a number of second carbon nanotubes 122 parallel to each other. The second carbon nanotubes 122 are combined by van der Waals force therebetween. The carbon nanotube segments 124 can be joined end-to-end by van der Waals force therebetween at extending directions of the second carbon nanotubes 122. In another embodiment, each carbon nanotube wire 12 includes a number of second carbon nanotubes 122. The second carbon nanotubes 122 are substantially oriented along a preferred orientation. Most of the second carbon nanotubes 122 in each carbon nanotube wire 12 extend along a same direction, and are joined end-to-end by van der Waals force. In one embodiment, the second carbon nanotubes 122 have the same length.

The at least one first carbon nanotube 14 is connected with adjacent carbon nanotube wires 12 by van der Waals force to form a freestanding structure. Therefore, the carbon nanotube film 10 has a freestanding structure. The carbon nanotube film 10 being a freestanding structure means that the carbon nanotube film 10 can maintain a film structure if part of the carbon nanotube film 10 is located on a supporter. For example, when the carbon nanotube film 10 is placed on a frame or two separate supporters, the portion of the carbon nanotube film 10 suspended between parts of the frame or between the two supporters will maintain its film structure integrity.

In one embodiment, a number of first carbon nanotubes 14 are located between adjacent carbon nanotube wires 12. The first carbon nanotubes 14 can be joined end-to-end by van der Waals force at different positions between the adjacent carbon nanotube wires 12. In another embodiment, some of the first carbon nanotubes 14 can be located between the adjacent carbon nanotube wires 12 joined at ends of the second carbon nanotubes 122 of the carbon nanotube wire 12, and some of the first carbon nanotubes 14 can be separately located at different positions of the adjacent carbon nanotube wires 12. In yet another embodiment, the first carbon nanotubes 14 can be located at substantially the same positions between the adjacent carbon nanotubes wires 12.

Figure 3:
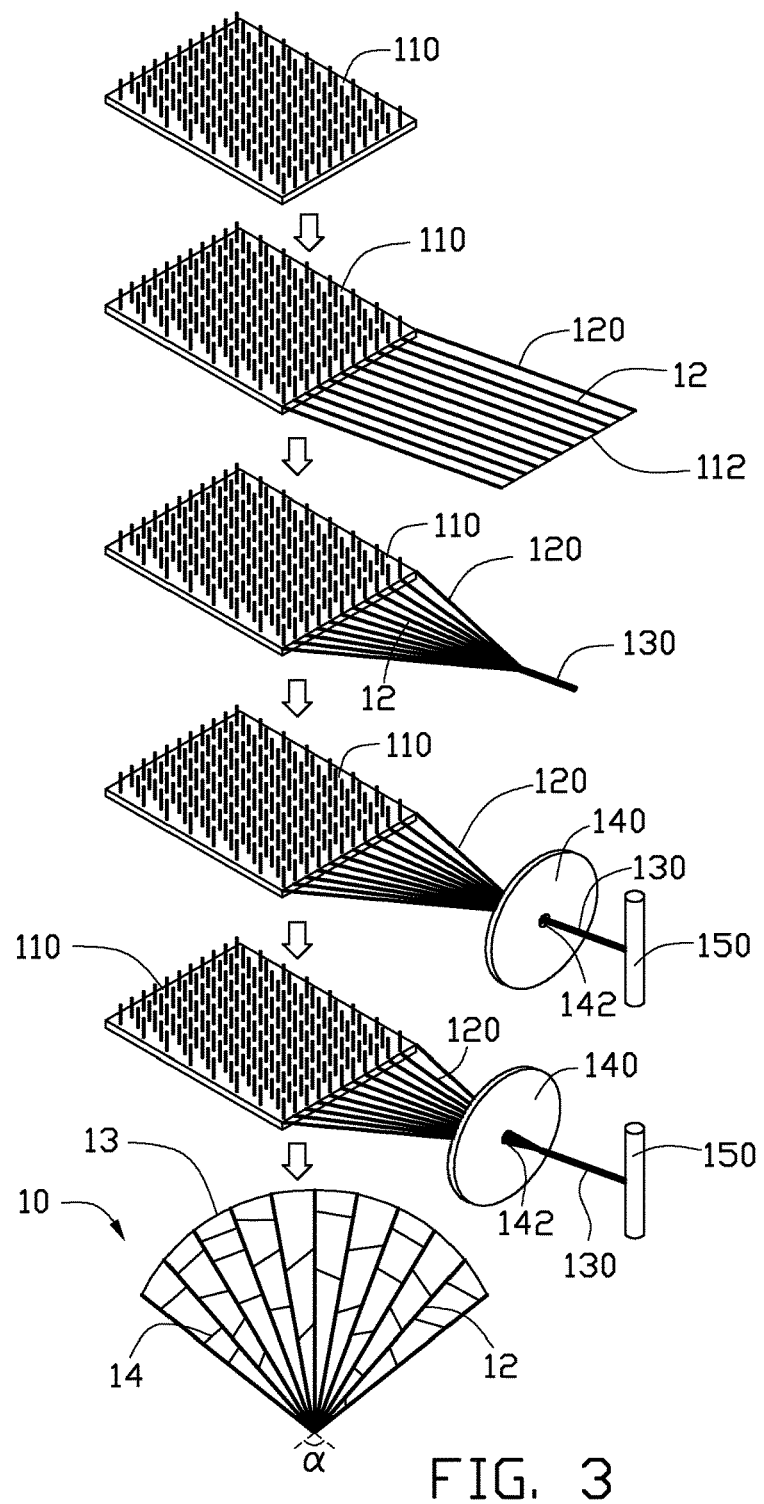
FIG. 3 is a flow chart of one embodiment of a method for making a carbon nanotube film.

Referring to FIG. 3, one embodiment of a method for making the carbon nanotube film 10 is provided. The method can include the following steps:

S10, providing an original carbon nanotube film 120 including a number of carbon nanotube wires 12, wherein each carbon nanotube wire 12 includes a number of successive and oriented carbon nanotube segments 124;

S20, converging a first end of the original carbon nanotube film 120 to form a carbon nanotube wire structure 130;

S30, passing the carbon nanotube wire structure 130 through an angle control unit 140 including an angle control element 142, and converging the original carbon nanotube film 12 at the angle control element 142 to form the open angle α by moving the angle control unit 140 relative to the carbon nanotube wire structure 130 to a predetermined position; and S40, obtaining the carbon nanotube film 20 with a predetermined shape, such as by cutting the original carbon nanotube film 120 having the predetermined open angle at the predetermined position.

In step S10, the original carbon nanotube film 120 includes the carbon nanotube wire 12 and at least one carbon nanotube connected between adjacent carbon nanotube wires 12. The original carbon nanotube film 120 can be obtained by drawing from a carbon nanotube array. The original carbon nanotube film 120 can also be prepared and then cut into a predetermined shape.

In one embodiment, the original carbon nanotube film 120 is made by the following steps: S11, providing a carbon nanotube array 110; and S12, pulling out the original carbon nanotube film 120 from the carbon nanotube array 110 using a tool 112.

In step S11, the carbon nanotube array 110 includes a number of carbon nanotubes. In one embodiment, the carbon nanotube array 110 can be a super-aligned carbon nanotube array. The carbon nanotubes in the super-aligned carbon nanotube array are substantially parallel to each other and perpendicular to a substrate.

The step S12 can further include the sub-steps: selecting one or more carbon nanotubes having a predetermined width from the carbon nanotube array 110 using the tool 112; and pulling the selected carbon nanotubes at a uniform speed along a direction to form carbon nanotube segments joined end to end to achieve the uniform original carbon nanotube film 120. In step (b), the tool 112 can be adhesive tape, pliers, tweezers, or another tool allowing multiple carbon nanotubes to be gripped and pulled simultaneously. In one embodiment, in the step S12, one end of the original carbon nanotube film 120 is connected with the carbon nanotube array 110.

During the pulling process, as the initial carbon nanotube segments are drawn out, other carbon nanotube segments are also drawn out end to end due to van der Waals attractive force between ends of adjacent carbon nanotube segments. The drawing process ensures a substantially continuous and uniform carbon nanotube film being formed. Therefore, the original carbon nanotube film 120 includes a number of carbon nanotube wires 12. The carbon nanotube wires 12 in the original carbon nanotube film 120 are substantially parallel to each other. The original carbon nanotube film 120 also includes at least one first carbon nanotube 14 located between adjacent carbon nanotube wires 12.

In step S20, the first end of the original carbon nanotube film 120 is substantially parallel to radial directions of the carbon nanotube wires 12 in the original carbon nanotube film 120. The carbon nanotube wire structure 130 can be formed by twisting around the first end of original carbon nanotube film 120 clockwise or counterclockwise. If the original carbon nanotube film 120 is connected with the carbon nanotube array 110, the first end of the original carbon nanotube film 120 is away from the carbon nanotube array 110.

In one embodiment, the step S20 can be executed by the following steps: using a mechanical arm hold the adhesive tape 112; clockwise twisting the side of the original carbon nanotube film 120 connected with the adhesive tape 112 to form the carbon nanotube wire structure 130; and removing the adhesive tape 112. In other embodiments, the step S20 can also be performed by removing the adhesive tape 112 first; and then twisting the original carbon nanotube film 120 to form the carbon nanotube wire structure 130.

The step S30 can include the sub-steps: passing the carbon nanotube wire structure 130 through the angle control element 142; and controlling the relative movement between the angle control unit 140 and the carbon nanotube wire structure 130, until the carbon nanotube wire structure 130 reaches the predetermined position. Wherein distances between adjacent carbon nanotube wires 12 gradually decrease from the carbon nanotube array 110 to the angle control element 142. The open angle α formed at the angle control element 142 is defined by two outermost carbon nanotube wires 12 at the angle control element 142. In one embodiment, the carbon nanotube wire structure 130 passes through the angle control element 142 at an angle substantially perpendicular to the angle control element 142.

The angle control unit 140 can be a barrier. The angle control element 142 can be a through hole or a slot defined in the angle control unit 140. A shape of the angle control element 142 can be circle, rectangle, or other polygons. An effective diameter of the angle control element 142 is larger than an effective diameter of the carbon nanotube wire structure 130. The angle control unit 140 can move back and forth along the carbon nanotube wire structure 130. The carbon nanotube wire structure 130 can also move away from the angle control element 142 and can twist.

During the movement of the carbon nanotube wire structure 130 relative to the angle control unit 140, the carbon nanotube wire structure 130 and the original carbon nanotube film 120 should not contact a surface of the angle control unit 140 and adhere to the angle control element 142. In one embodiment, the material of the angle control unit 140 and the angle control element 142 does not adhere to the carbon nanotube wire structure 130 easily. In one embodiment, a moving direction of the carbon nanotube wire structure 130 is substantially parallel to a pulling direction of the original carbon nanotube film 120.

A width of the original carbon nanotube film 120 is larger than the effective diameter of the angle control element 142. Therefore, the carbon nanotube wires 12 of the original carbon nanotube film 120 can converge at the angle control element 142. Part of the original carbon nanotube film 10 can have a triangular shape. As the carbon nanotube wire structure 130 reaches the predetermined position, the distance between adjacent carbon nanotube wires 12 gradually decreases along a direction formed by the carbon nanotube wires 12 close to the predetermined position. When the carbon nanotube wire structure 130 reaches the predetermined position, the carbon nanotube wires 12 of the original carbon nanotube film 120 converge at the angle control element 142 to form the first end 11 of the carbon nanotube film 10. At the same time, the open angle α is formed. Because the first end 11 of the carbon nanotube film 10 is formed at the angle control element 142, if the effective diameter of the angle control element 142 is relatively small, the first end 11 can be considered a point. If the effective diameter of the angle control element 142 is relative large, the first end 11 can be cut into a desired shape, such as a straight line, a curve, or a broken line.

The open angle α of the carbon nanotube film 10 can be controlled by the effective diameter of the angle control element 142, and a space between a second end of the original carbon nanotube film 120 and the angle control unit 140. The second end of the original carbon nanotube film 120 is opposite to the first end of the original carbon nanotube film 120, and the second end of the original carbon nanotube film 120 is away from the carbon nanotube wire structure 130 and the angle control unit 140. If the original carbon nanotube film 120 is directly drawn from and connected with the carbon nanotube array 110, the space is a distance between the carbon nanotube array 110 and the angle control unit 140. The space is equal to a distance between the angle control unit 140 and a joint between the carbon nanotube array 110 and the original carbon nanotube film 120.

If the effective diameter of the angle control element 142 is kept unchanged, and if the space between the carbon nanotube array 110 and the angle control unit 140 is larger, the open angle α is smaller. If the space is smaller, the open angle α is larger. If the space between the carbon nanotube array 110 and the angle control unit 140 is fixed, and if the effective diameter of the angle control element 142 is greater, the open angle α is smaller. If the effective diameter of the angle control element 142 is smaller, the open angle α is larger.

When the original carbon nanotube film 120 is drawn from and connected with the carbon nanotube array 110, a step of moving the carbon nanotube wire structure 130 to the predetermined position can be executed by making the relative movement between the carbon nanotube wire structure 130 and the angle control unit 140. In one embodiment, the carbon nanotube wire structure 130 is fastened, and the angle control unit 140 is moved toward the carbon nanotube array 110. In another embodiment, the angle control unit 140 is fixed, and the carbon nanotube wire structure 130 is pulled away from the carbon nanotube array 110. In another embodiment, the angle control unit 140 is drawn toward the carbon nanotube array 110, and the carbon nanotube wire structure 130 is moved away from the carbon nanotube array 110.

The step S40 can include the sub-steps: applying the original carbon nanotube film 120 on a carrier; cutting the original carbon nanotube film 120 at the angle control element 142 to form the first end 11 of the carbon nanotube film 10; and cutting the original carbon nanotube film 120 at a location opposite to the first end 11 of the carbon nanotube film 10 to form the second end 13 of the carbon nanotube film. The second end 13 is formed by cutting the original carbon nanotube film 120 in a predetermined pattern to form a desired shape. In one embodiment, the carrier is the angle control unit 140, and the original carbon nanotube film 120 can be cut down by using a laser.

In one embodiment, the carbon nanotube film 10 can be made by the following steps:

A carbon nanotube array 110 is provided. The carbon nanotube array 110 is a super-aligned carbon nanotube array, and grown on a substrate (not labeled).

The original carbon nanotube film 120 is drawn from the carbon nanotube array 110 using a tool such as an adhesive tape 112. During the drawing process of the carbon nanotube array 110, an angle between a drawing direction and a surface of the substrate for growing the carbon nanotube array 110 is about 5 degrees.

One end of the original carbon nanotube film 120 adhered to the adhesive tape 112 is twisted clockwise into the carbon nanotube wire structure 130.

The carbon nanotube wire structure 130 goes through the angle control element 142 of the angle control unit 140, and then fixed on a support 150. The angle control unit 140 is a circular flat barrier, and the angle control element 142 is a circular through hole. The support 150 can move along the drawing direction of the original carbon nanotube film 120, thereby moving the carbon nanotube wire structure 130. The support 150 can also rotate around itself.

The support 150 is rotated around itself, and the carbon nanotube wire structure 130 fixed on the support 150 is wrapped around the support 150. The original carbon nanotube film 120 can be continuously drawn from the carbon nanotube array 110. At the same time, the angle control unit 140 is substantially perpendicular to the carbon nanotube wire structure 130, and moves toward the carbon nanotube array 110. Two sides of the original carbon nanotube film 120 contact the angle control element 142. The two sides of the original carbon nanotube film 120 connect the first and second ends of the carbon nanotube film 120. When the open angle α is about 60 degrees at the angle control element 142, the angle control unit 140 stops moving, and the support 150 rotates around itself until the original carbon nanotube film 120 is substantially uniform.

The angle control unit 140 is rotated to lay the original carbon nanotube film 120 with the open angle α of about 60 degrees on a surface of the angle control unit 140. The original carbon nanotube film 120 is cut at the angle control element 142 using a laser to form the first end 11 of the carbon nanotube film 10. The original carbon nanotube film 120 is cut along an edge of the circular-shaped angle control unit 140, to form the second end 13 of the carbon nanotube film 10. The second end 13 is arc-shaped. Thus, a pie-shaped carbon nanotube film 10 is formed. Because the diameter of the angle control element 142 is small, the first end 11 can be converged into a point.

The carbon nanotube film 10 includes a number of carbon nanotube wires 12, and the carbon nanotube wires 12 fan out from the first end 11 to the send end 13. The space between adjacent two carbon nanotube wires 12 gradually increase from the first end 11 to the second end 13. Therefore the carbon nanotube film 10 has a specific shape, and can be used to culture biological cells with a specific shape.

The method for making the carbon nanotube film 10 accurately controls the open angle α. The carbon nanotube film 10 made by the above-mentioned method is substantially uniform, including a thickness of the carbon nanotube film 10. In addition, the original carbon nanotube film 120 can be continuously drawn from the carbon nanotube array 110, and the carbon nanotube film 10 can be continuously produced. Therefore, the method for making the carbon nanotube film 10 can be used in commercial production of the carbon nanotube film 10.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A carbon nanotube film consisting of:
a plurality of carbon nanotube wires, and a plurality of first carbon nanotubes connected between adjacent carbon nanotube wires of the plurality of carbon nanotubes wires, wherein the carbon nanotube film defines a first end and a second end opposite to the first end, shapes of the first end and the second end are straight lines, the plurality of carbon nanotube wires fan out from the first end to the second end such that a distance between the adjacent carbon nanotube wires gradually increases from the first end to the second end, the plurality of carbon nanotube wires converge at the first end, and the plurality of first carbon nanotubes are located between adjacent carbon nanotube wires and joined end-to-end by van der Waals force, each of the plurality of carbon nanotube wires consists of a plurality of second carbon nanotubes parallel with each other.

2. The carbon nanotube film of claim 1, wherein the plurality of second carbon nanotubes are joined end-to-end along the same direction by van der Waals force.

3. The carbon nanotube film of claim 1, wherein the carbon nanotube film comprises two outermost sides, an open angle is defined by extending lines of the two outermost sides; and the open angle is equal to or larger than 30 degrees, and less than or equal to 120 degrees.

4. The carbon nanotube film of claim 1, wherein angles defined by the adjacent carbon nanotube wires are substantially equal.

5. The carbon nanotube film of claim 1, wherein the carbon nanotube film is a freestanding structure.

6. The carbon nanotube film of claim 1, wherein the second end is arc-shaped.

7. The carbon nanotube film of claim 1, wherein a plurality of angles are defined by the adjacent carbon nanotube wires, and the plurality of angles are substantially equal.

8. The carbon nanotube film of claim 1, wherein each of the plurality of carbon nanotube wires comprises a number of successive and oriented carbon nanotube segments.

9. The carbon nanotube film of claim 8, wherein each carbon nanotube segment comprises a plurality of second carbon nanotubes parallel to each other, and the second carbon nanotubes are combined by van der Waals force therebetween.

10. The carbon nanotube film of claim 9, wherein the carbon nanotube segments are joined end-to-end by van der Waals force therebetween at extending directions of the second carbon nanotubes.

11. The carbon nanotube film of claim 1, wherein the carbon nanotube film has a freestanding structure.

12. The carbon nanotube film of claim 1, wherein the carbon nanotube film consists of carbon nanotubes.

13. The carbon nanotube film of claim 1, wherein the carbon nanotube film comprises two outermost sides, an open angle is defined by extending lines of the two outermost sides; and the open angle is equal to or larger than 30 degrees, and less than or equal to 90 degrees.

* * * * *